US012160672B2

(12) United States Patent
Kuo et al.

(10) Patent No.: US 12,160,672 B2
(45) Date of Patent: Dec. 3, 2024

(54) HEAD MOUNTED DISPLAY DEVICE

(71) Applicant: HTC Corporation, Taoyuan (TW)

(72) Inventors: Yan-Min Kuo, Taoyuan (TW); Jun-Lin Guo, Taoyuan (TW); Wei-Chen Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 128 days.

(21) Appl. No.: 18/080,760

(22) Filed: Dec. 14, 2022

(65) Prior Publication Data

US 2023/0319425 A1      Oct. 5, 2023

Related U.S. Application Data

(60) Provisional application No. 63/324,644, filed on Mar. 29, 2022.

(51) Int. Cl.
*H04N 23/90*        (2023.01)
(52) U.S. Cl.
CPC .................... *H04N 23/90* (2023.01)
(58) Field of Classification Search
CPC ..................................... H04N 23/90
USPC ....................................... 348/158
See application file for complete search history.

(56) References Cited

U.S. PATENT DOCUMENTS

2016/0165151 A1*  6/2016  Corlett ............... G06T 1/20
                                                  348/164

FOREIGN PATENT DOCUMENTS

CN       107005653       4/2021

OTHER PUBLICATIONS

"Office Action of Taiwan Counterpart Application", issued on Nov. 1, 2023, p. 1-p. 5.

* cited by examiner

*Primary Examiner* — Nguyen T Truong
(74) *Attorney, Agent, or Firm* — JCIPRNET

(57) ABSTRACT

A head-mounted display device includes a main body, a first sensor and a second sensor. The first sensor is disposed on a first setting area of the main body. The second sensor is disposed on a second setting area of the main body. The first setting area and the second setting area respectively have a first central point and a second central point, where the first central point and the second central point are disposed on a horizontal axis. There is a first angle between a connection line of the first central point and the first sensor with the horizontal axis, and there is a second angle between a connection line of the second central point and the second sensor with the horizontal axis, where the first angle is different from the second angle.

11 Claims, 3 Drawing Sheets

HEAD MOUNTED DISPLAY DEVICE

CROSS-REFERENCE TO RELATED APPLICATION

This application claims the priority benefit of U.S. provisional application Ser. No. 63/324,644, filed on Mar. 29, 2022. The entirety of each of the above-mentioned patent applications is hereby incorporated by reference herein and made a part of this specification.

BACKGROUND

Technical Field

The disclosure relates to a head mounted display device, and in particular, to a head mounted display device that improves the accuracy of eye tracking actions.

Description of Related Art

In the head mounted display device, in order to effectively achieve the interactive effect between the user and the virtual world, it is a necessary technology to track the user's eye state. In the known technical field, the sensor used to capture the eye image is often set in a specific position of the head-mounted display device, such as the bottom or side corresponding to the position of the user's eye. In such a configuration state, when the head mounted display device is actually applied, the image information obtained from the user's eyes may not be clear enough due to environmental factors such as the glasses worn by the user, the occlusion or reflection caused by external fog, and the exposure of external light. In this way, the accuracy of the eye tracking action is reduced, thereby reducing the user experience.

SUMMARY

The invention provides a head mounted display device, which can improve the accuracy of eye tracking.

A head-mounted display device of the invention includes a main body, a first sensor and a second sensor. The first sensor is disposed on a first setting area of the main body. The second sensor is disposed on a second setting area of the main body. The first setting area and the second setting area respectively have a first central point and a second central point, where the first central point and the second central point are disposed on a horizontal axis. There is a first angle between a connection line of the first central point and the first sensor with the horizontal axis, and there is a second angle between a connection line of the second central point and the second sensor with the horizontal axis, where the first angle is different from the second angle.

Based on the above, the head mounted display device of the invention puts the first sensor and the second sensor in two asymmetric positions in different setting areas to capture the image information of the user's first eye and second eye respectively through different image capture angles. The head mounted display device of the invention executes the eye tracking action according to the above image information, which can improve the accuracy of the image tracking result.

DESCRIPTION OF THE EMBODIMENTS

Figure 1:
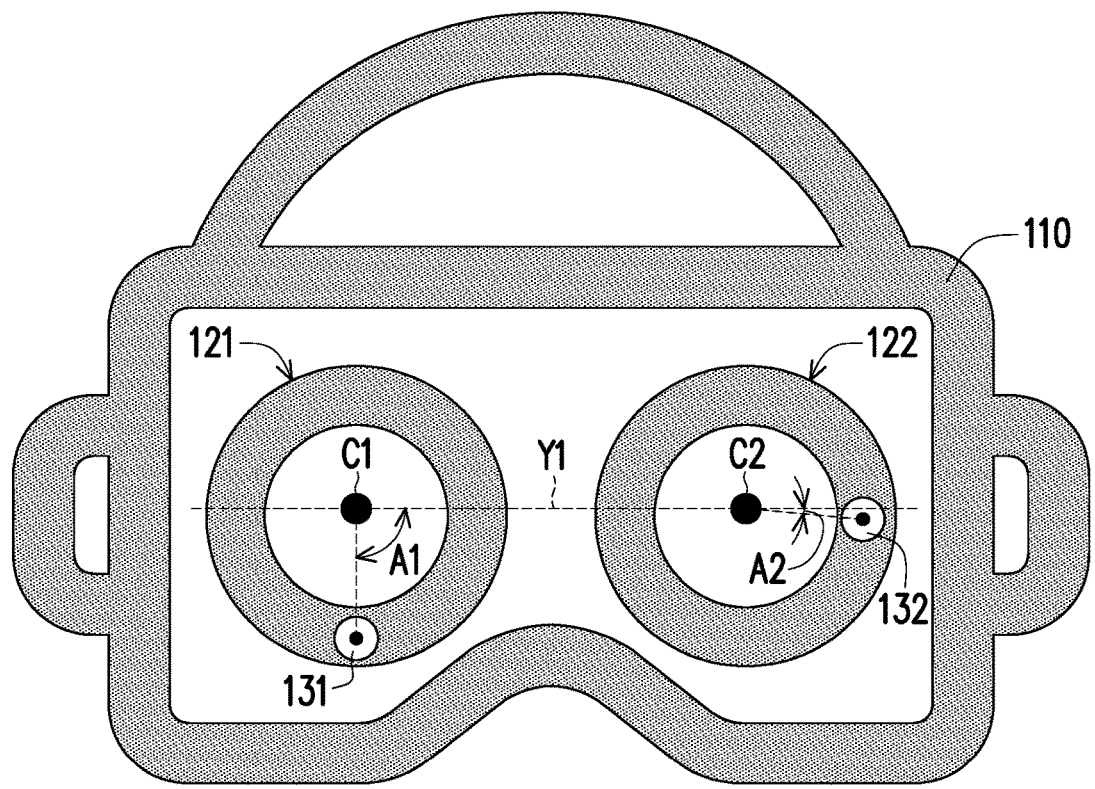
FIG. 1 is a schematic diagram of a head mounted display device according to an embodiment of the invention.

Referring to FIG. 1, FIG. 1 is a schematic diagram of a head mounted display device according to an embodiment of the invention. The head mounted display device 100 includes a main body 110 and sensors 131, 132. The sensors 131, 132 are disposed on setting areas 121 and 122 of the main body respectively. In the embodiment, the setting area 121 corresponds to a position of a first eye of the user of the head mounted display device 100, and the setting area 122 corresponds to a position of a second eye of the user of the head mounted display device 100. The sensors 131, 132 can be cameras or other image capture devices that can capture image information, and are used to capture the image information of the first eye and second eye of the user respectively.

In the embodiment, the setting area 121 may have a central point C1, and the setting area 122 may have a central point C2. The central point C1 and the central point C2 can be set on a horizontal axis Y1. The sensor 131 is arranged around the setting area 121, wherein a connection line between the sensor 131 and the central point C1 has an angle A1 with the side of the horizontal axis Y1 in a first direction. The sensor 132 is arranged around another setting area 122, wherein a connection line between the sensor 132 and the central point C2 has an angle A2 with the horizontal axis Y1 in the first direction. The angles A1 and A2 are different.

In the embodiment, the absolute value of the difference between the angles A1 and A2 may be greater than a preset threshold. angles A1 and A2. That is to say, the sensor 131 can capture the image information of the first eye of the user of the head mounted display device 100 through a first direction (such as the bottom), and the sensor 132 can capture the image information of the second eye of the user of the head mounted display device 100 through a second direction (such as side).

In the embodiment of the invention, the sensors 131, 132 can capture the image information of different eyes of the user from different directions. When the head mounted display device 100 is actually used, such as when wearing glasses of different shapes that cause the frames to obscure the eyes, or when the user is gazing in a particular direction, the sensors 131, 132 with different shooting angles can effectively reduce the probability that the image information of the eye cannot be used as an eye tracking action. For example, when the image information generated by the bottom-illuminated sensor 131 cannot be used as sufficient information for eye tracking, it can be supplemented by the image information generated by the side-illuminated sensor 132; and when the image information generated by the side-illuminated sensor 132 cannot be used as sufficient information for eye tracking, it can be supplemented by the image information generated by the bottom-illuminated sensor 131.

Figure 2:
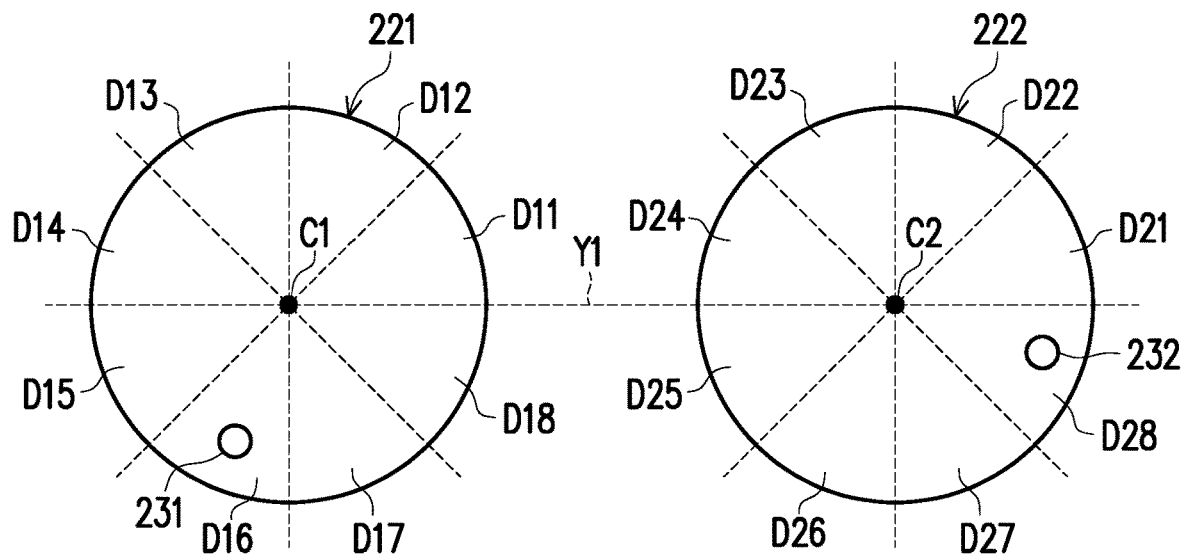
FIG. 2 is a schematic diagram illustrating a configuration of sensors of a head mounted display device according to another embodiment of the invention.

Referring to FIG. 2 below, FIG. 2 is a schematic diagram illustrating a configuration of sensors of a head mounted display device according to another embodiment of the invention. Wherein, in the head mounted display device 200, there is a central point C1 in a setting area 221 corresponding to the user's first eye, and the central point C1 is set on a horizontal axis Y1. The setting area 221 can be divided into multiple partitions D11~D18 according to an angle with the horizontal axis Y1. Wherein each of the partitions D11~D18 has the same central angle. There is a central point C2 in a setting area 222 corresponding to the user's second eye, and the central point C2 is also set on the horizontal axis Y1. The setting area 222 can be divided into multiple partitions D21~D28 according to an angle with the horizontal axis Y1. Wherein each of the partitions D21~D28 has the same central angle.

In the embodiment, the number of partitions D11~D18 in the setting area 221 may be the same as the number of partitions D21~D28 in the setting area 222. And each of the partitions D11~D18 has the same central angle as each of the partitions D21~D28. The partitions D11~D18 in the setting area 221 can correspond to the partitions D21~D28 in the setting area 222 according to the angle with the horizontal axis Y1.

It should be noted that, in the head mounted display device 200, the sensor 231 corresponding to the user's first eye can be disposed on the selected partition (such as partition D16) among the partitions D11~D18 in the setting area 221, and the sensor 232 corresponding to the user's second eye can be disposed on the selected partition (such as partition D28) in the partitions D21~D28 in the setting area 222. The partition D16 where the sensor 231 is located and the partition D28 where the sensor 232 is located do not correspond to each other.

By respectively setting the sensors 231, 232 on non-corresponding partitions D16, D28, the sensors 231, 232 and the corresponding user's eyes can have different image capturing angles. The sensors 231, 232 can respectively acquire the image information of the user's eyes through different image capture angles, and can eliminate the interference phenomenon caused by various factors of the user, and improve the accuracy of the eye tracking action.

It should be noted that, in the embodiment of the invention, the partitions set in a single setting area can be less than 8 or more than 8. The eight partitions shown in FIG. 2 are just an example for illustration and are not intended to limit the scope of the present invention.

Figure 3:
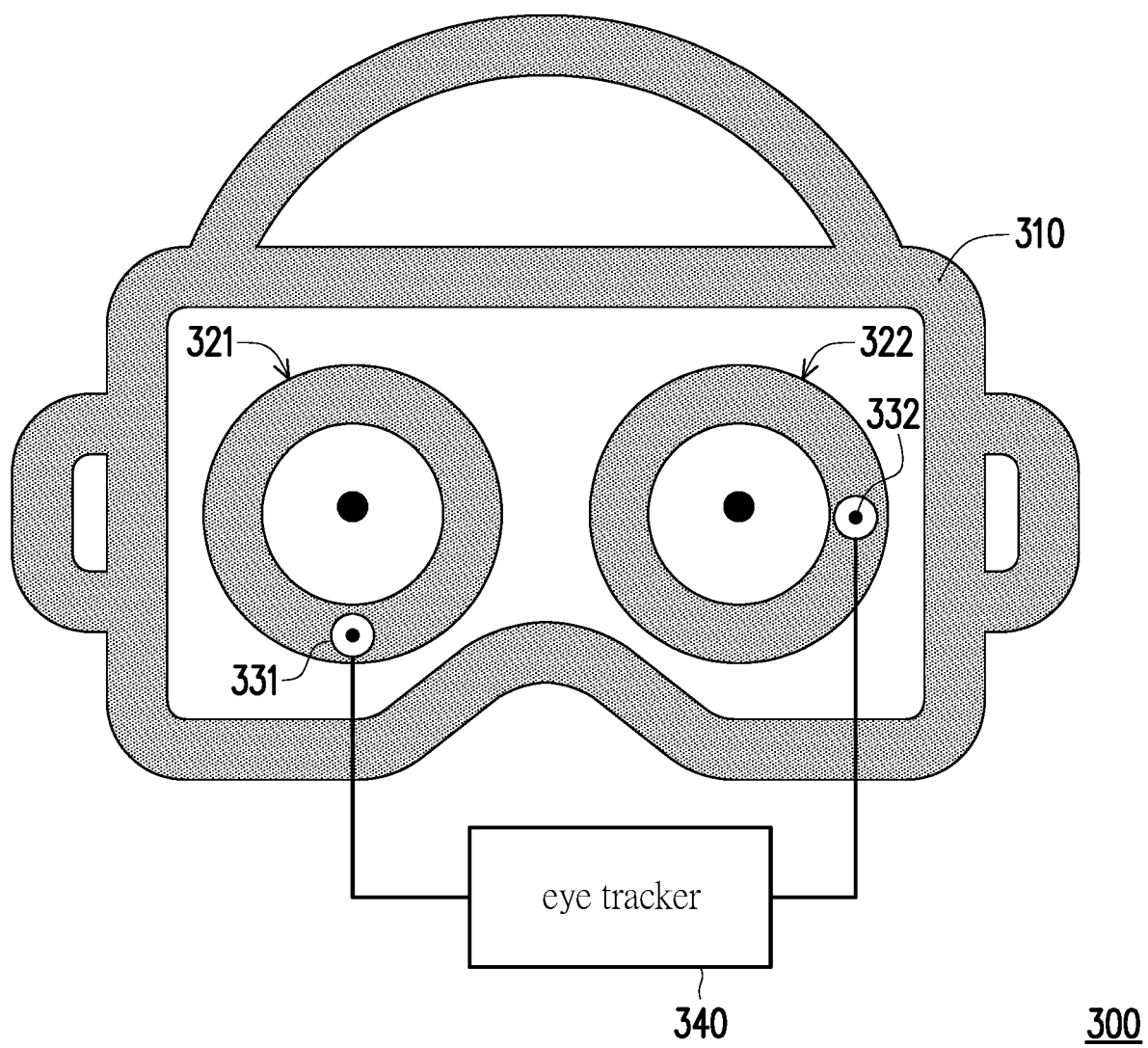
FIG. 3 is a schematic diagram of a head mounted display device according to another embodiment of the invention.

Referring to FIG. 3 below, FIG. 3 is a schematic diagram of a head mounted display device according to another embodiment of the invention. The head mounted display device 300 includes a main body 310, sensors 331, 332 and an eye tracker 340. The sensors 331, 332 are respectively disposed on setting areas 321 and 322 of the main body 310, and have different image capture angles for the corresponding user's eyes. The location configuration relationship of the sensors 331 and 332 in the embodiment is similar to the embodiment in FIG. 1, and will not be repeated here.

In the embodiment, the eye tracker 340 is coupled to the sensors 331, 332. The image information of the user's eyes generated by the sensors 331 and 332 can be transmitted to the eye tracker 340. The eye tracker 340 can calculate a first weight according to a reliability of the image information corresponding to a first eye of the user, and calculate a second weight according to a reliability of the image information corresponding to a second eye of the user. The eye tracker 340 then calculates the image information corresponding to the first eye of the user and the image information corresponding to the second eye of the user according to the first weight and the second weight to generate a binocular image information.

In detail, the eye tracker 340 can obtain the reliability corresponding to the image information according to at least one of the degree of occlusion of the eye image, the degree of deformation of the pupil image, the degree of influence of the image by fog or reflection, and the degree of influence of the image by external light in the image information, and generate the corresponding weight accordingly. When at least one of the degree of occlusion of the eye image, the degree of deformation of the pupil image (such as degree of narrowing), the degree of influence of the image by fog or reflection, and the degree of influence of the image by external light is relatively high, it can reduce the weight of the corresponding image information and increase the weight of another image information. Wherein, in the embodiment of the invention, the first weight is complementary to the second weight.

The eye tracker 340 can perform complementary operations on the image information of the first eye and the image information of the second eye of the user based on the first weight and the second weight, so as to generate the binocular image information. Wherein, the binocular image information may have a relatively high degree of realism. The eye tracking action performed by the eye tracker 340 according to the binocular image information may have relatively high tracking accuracy.

On the other hand, in the embodiment of the invention, the sensors 331, 332 can perform time-division and multiple times of capturing the image information of the user's eye. The eye tracker 340 can, for example, use machine learning to estimate the confidence value of image segmentation, the jumping degree of the final gaze information calculation result, the flatness of pupil shape or image signal-to-noise ratio, image clarity and other factors. All of the above can be used as quantified reliability to assign different weights to the gaze information results of the user's eyes, thereby estimating the gaze information of the user's eyes.

For example, where the eye tracker 340 can apply machine learning to estimate the confidence value of image segmentation as an example of the weight of binocular weighting. Assuming that the image information of the first eye is too flat and has irregular shapes at the corners, the confidence value of image segmentation calculated by machine learning can be 0.823. And the pupil contour of the image information of the second eye is clear and complete, and its confidence value can be 0.978. The eye tracker 340 can calculate the ratio of the confidence value (=0.823) and the confidence value (=0.978) to the sum of the confidence values (=0.823+0.978) to calculate the first weight and the second weight. Then, the final combined image processing result can be obtained by weighting and merging the binocular image information as the image processing result.

Certainly, the above-mentioned example of machine learning is only an example of implementation for illustration, and the weighted calculation mechanism of image processing well known in the art can be applied to the present invention, without specific limitation.

In the embodiment, the eye tracker 340 may have a processor with computing power, or have a design method through Hardware Description Language (HDL) or any other digital circuit well known to those skilled in the art, and realize the hardware circuit through Field Programmable Gate Array (FPGA), Complex Programmable Logic Device (CPLD) or Application-specific Integrated Circuit (ASIC).

Figure 4:
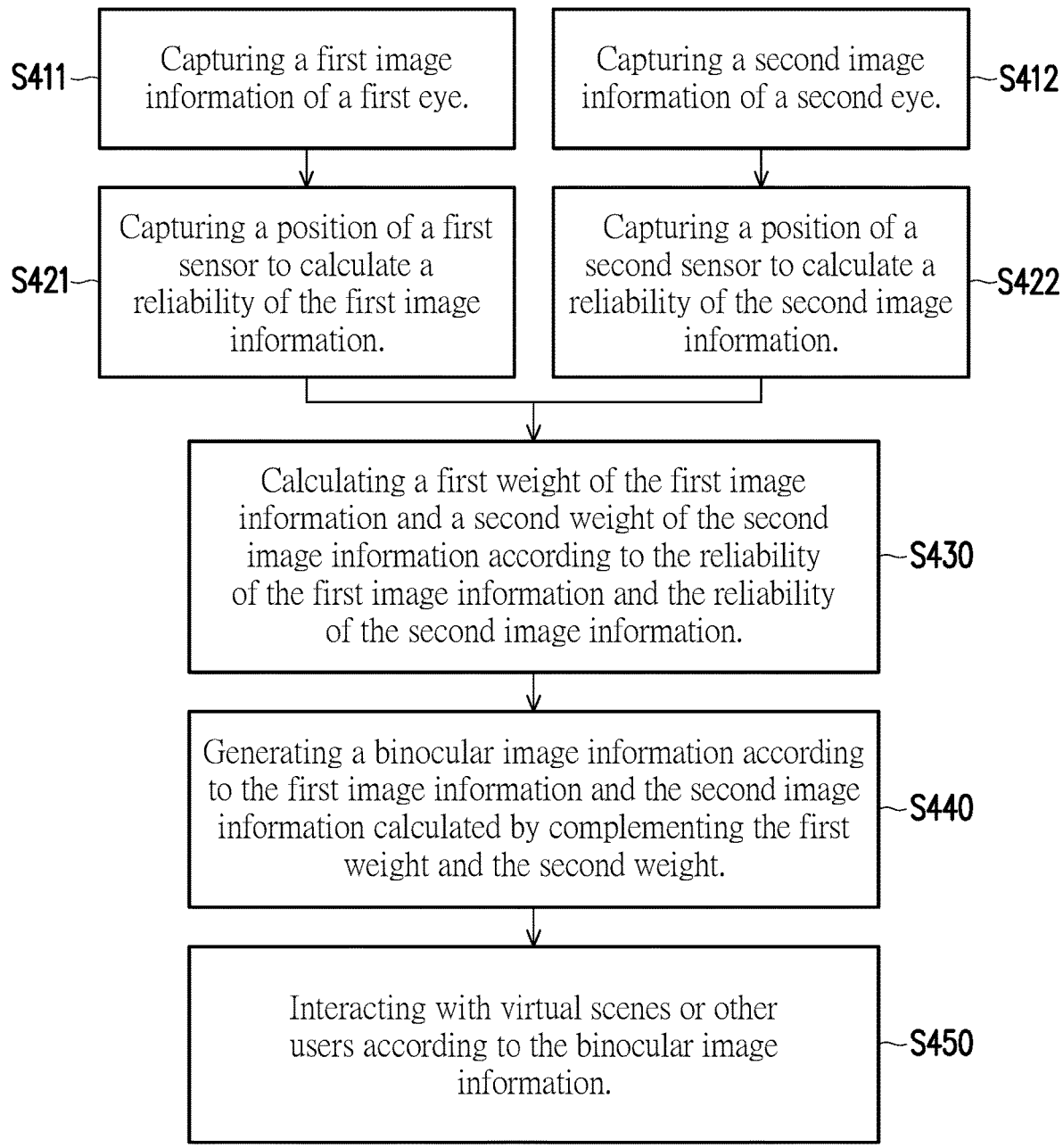
FIG. 4 is a flow chart of the eye tracking operation of the head mounted display device according to an embodiment of the invention.

Referring to FIG. 4 below, FIG. 4 is a flow chart of the eye tracking operation of the head mounted display device according to an embodiment of the invention. In Steps S411 and S412, a first sensor and a second sensor with different image capturing angles can respectively capture a first image information of a first eye (S411) and capture a second image information of a second eye (S412). Then, in Step S421, the eye tracker can capture a position of the first sensor to calculate a reliability of the first image information. In Step S422, the eye tracker can capture a position of the second sensor to calculate a reliability of the second image information. In Step S430, the eye tracker can calculate a first weight of the first image information and a second weight of the second image information according to the reliability of the first image information and the reliability of the second image information.

In Step S440, the eye tracker can generate a binocular image information according to the first image information and the second image information calculated by complementing the first weight and the second weight. And in Step S450, the eye tracker can interact with virtual scenes or other users according to the binocular image information.

In the embodiment, the head mounted display device obtains image information through sensors with different viewing angles respectively, and establishes corresponding weights according to the reliability of the image information. Then, the binocular image information generated by weight calculation can effectively and truly reconstruct the user's eye image. By effectively eliminating the interference of environmental factors, the accuracy of eye tracking actions is effectively improved, and the user's experience of virtual reality is enhanced.

In summary, the head mounted display device of the invention is provided with sensors at asymmetric positions in the two setting areas corresponding to the eyes of the user, and makes the two sensors have different image capture angles of the eye image. In this way, the head mounted display device can reconstruct the eye image according to the image information with different viewing angles, which can effectively improve the realism of the eye image, and further improve the accuracy of the eye tracking action.

What is claimed is:

1. A head mounted display device, comprising:
   a main body;
   a first sensor, disposed on a first setting area of the main body; and
   a second sensor, disposed on a second setting area of the main body,
   wherein the first setting area and the second setting area respectively have a first central point and a second central point, where the first central point and the second central point are disposed on a horizontal axis, there is a first angle between a connection line of the first central point and the first sensor with the horizontal axis, and there is a second angle between a connection line of the second central point and the second sensor with the horizontal axis, where the first angle is different from the second angle.

2. The head mounted display device according to claim 1, wherein the absolute value of the difference between the first angle and the second angle is greater than a preset threshold.

3. The head mounted display device according to claim 1, wherein the first setting area is divided into multiple first partitions according to the angle with the horizontal axis based on the first central point, the second setting area is divided into multiple second partitions according to the angle with the horizontal axis based on the second central point, and the first partitions correspond to the second partitions respectively.

4. The head mounted display device according to claim 3, wherein the first sensor is on a first selected partition of one of the first partitions, the second sensor is on a second selected partition of one of the second partitions, and the first selected partition and the second selected partition do not correspond to each other.

5. The head mounted display device according to claim 4, wherein each of the first partitions and each of the second partitions have the same central angle.

6. The head mounted display device according to claim 1, wherein the first setting area corresponds to a position of a first eye of a user, and the second setting area corresponds to a position of a second eye of the user.

7. The head mounted display device according to claim 5, wherein the first sensor is used to capture a first image information of the first eye of the user, and the first sensor is used to capture a second image information of the second eye of the user.

8. The head mounted display device according to claim 7, further comprises:
   an eye tracker, coupled to the first sensor and the second sensor, the eye tracker calculates a first weight based on the reliability of the first image information, calculates a second weight based on the reliability of the second image information, and performs calculation on the first image information and the second image information to generate a binocular image information according to the first weight and the second weight.

9. The head mounted display device according to claim 8, wherein the eye tracker obtains the reliability corresponding to the first image information and the second image information respectively according to at least one of the degree of occlusion of the eye image, the degree of deformation of the pupil image, the degree of influence of the image by fog or reflection, and the degree of influence of the image by external light in the first image information and the second image information.

10. The head mounted display device according to claim 8, wherein the eye tracker calculates the reliability of the first image information at multiple time points to obtain the first weight, and calculates the reliability of the second image information at the time points to obtain the second weight.

11. The head mounted display device according to claim 8, wherein the first weight is complementary to the second weight.

* * * * *